(No Model.)
G. H. PRESTON.
FRICTION CLUTCH.
No. 300,733. Patented June 17, 1884.
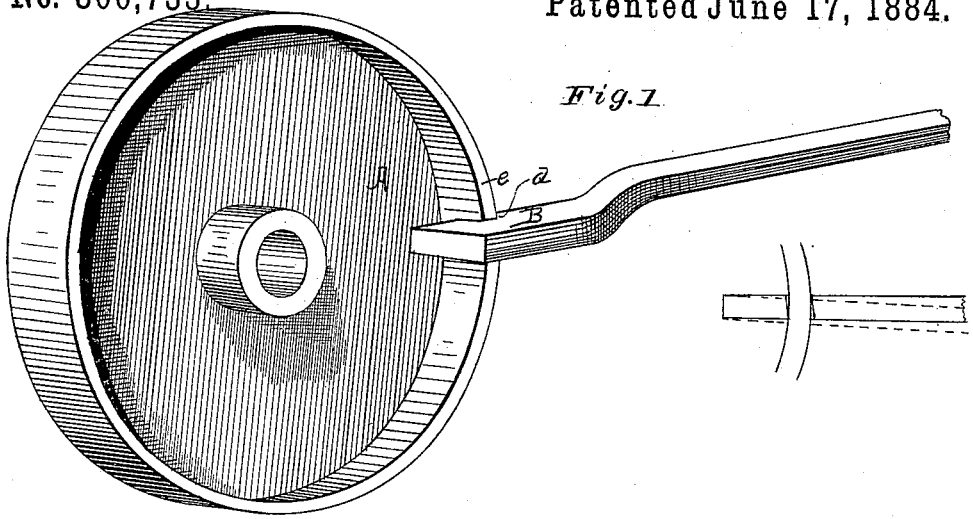
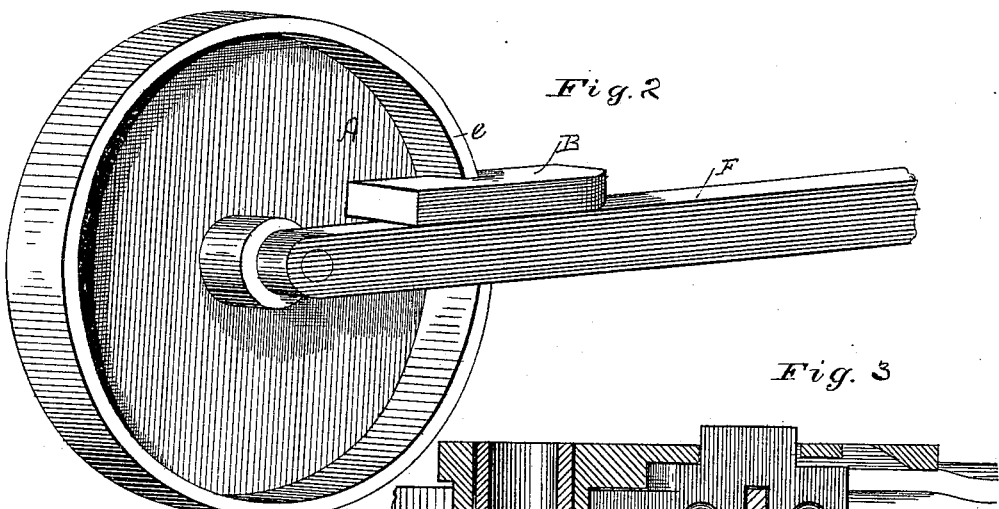
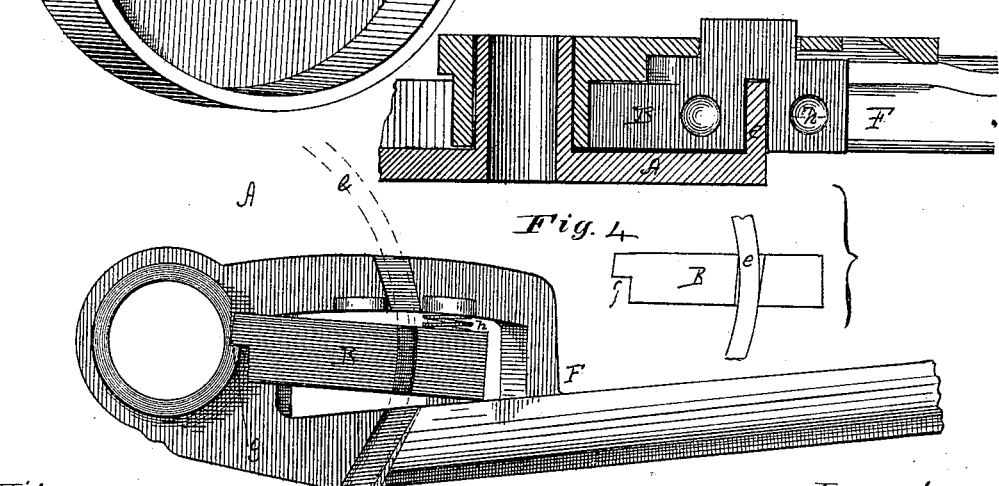
Witnesses:
J. C. Turner
M. V. Smith
Inventor
Geo. H. Preston
By his atty
R. D. O. Smith

UNITED STATES PATENT OFFICE.

GEORGE H. PRESTON, OF SHORTSVILLE, NEW YORK, ASSIGNOR OF ONE-HALF TO THE EMPIRE DRILL COMPANY, OF SAME PLACE.

FRICTION-CLUTCH.

SPECIFICATION forming part of Letters Patent No. 300,733, dated June 17, 1884.

Application filed November 22, 1883. (No model.)

*To all whom it may concern:*

Be it known that I, GEORGE H. PRESTON, of Shortsville, in Ontario county, and State of New York, have invented a new and useful Improvement in Friction-Clutches; and I do hereby declare that the following is a full and accurate description of the same.

My invention relates to that class of friction-clutches which operate by gripping the peripheral flange of a pulley or wheel or similar device; and it consists in an arm or lever pivoted at its inner end, said pivot being coincident with the axis of the said wheel and a secondary lever mounted upon said arm provided with a transverse notch fitted to embrace the lateral edge of the peripheral flange, said secondary lever being in engagement at its inner end with said arm at a point near to the pivotal center, so that said arm and secondary lever operated with a compound leverage in gripping the edge of the wheel.

I am aware that many friction-clutches have been heretofore made adapted to act against the peripheral flange of the wheel; but so far as I know they have never heretofore been arranged to act with a compound leverage to cramp the edge of the wheel to insure against slip. All act by friction derived from some form of cam or toggle action. These are different from my device in mode of action, as they act from pressure outwardly in a radial direction, while my device acts by cramping the edge of the wheel between two frictional pressures, one moving inwardly and the other outwardly. This cramping-action is well known, having been utilized in connection with many appliances in the arts—as, for instance, movable jaw-wrenches, step-ladders, paper-holders, clothes-pins, &c. I therefore do not claim this peculiar mechanical mode of action as my discovery. I am not aware, however, that it has ever heretofore been employed as a clutch to transmit motion to moving machinery, and I therefore design to claim the mode whereby this use is made effective.

Having now set out the matter of my invention, I will more particularly describe the apparatus, whereby it may be rendered effective, and also the structure which I consider the best for the purpose, having reference to the accompanying drawings, wherein—

Figure 1 is a perspective view of the primary form of my apparatus. Fig. 2 is a perspective of the secondary form of my apparatus. Fig. 3 represents in perspective the preferred form of my apparatus. Fig. 4 is a side elevation of the same.

Referring to Fig. 1, A is the wheel, to which motion on its axis is to be imparted. This motion may be applied to any of the purposes for which a revolving shaft is applicable.

B is a lever, free to vibrate at its outer end. A transverse notch, *d*, is made in one edge of the lever B, wide enough to receive laterally-projecting peripheral edge *e* of the wheel A. When the lever is in its initial position, the edge *e* of the wheel A may run freely in said notch, but when said lever is moved in the plane of the wheel away from said initial position, then the upper edge angle of the notch comes in contact with one surface of the edge *e*, and the lower edge angle comes in contact with the opposite surface of said edge, and pressure is exerted at said points of contact in opposite directions as to the surface impinged. Said pressure is proportionate to the difference in the distance between the impinging points and the point where the actuating-power is applied to the lever B. The effect is to pinch or cramp the edge *e* in the notch, and the frictional contact thus produced is augmented by the bite of the angular points of contact, so that power applied to the lever B will be very effectively transmitted to turn the wheel upon its axis; and to continue said rotary motion it is necessary to alternately raise and lower the outer end of the lever B, the biting contact and transmitted motion occurring during one movement, and a free slipping on the edge *e* to a fresh point of contact occurring during the other movement. In practice it is preferred to associate the lever B with a supplemental lever, F, Fig. 2, which is pivoted at its inner end to some suitable support, and extended at its free end beyond the lever B with which it is in engagement at its free end. This permits a permanency of arrangement which is not possible with the simple arrangement shown in Fig. 1, although the mechanical principles involved are the same. The arrangement which I prefer when considerable power is to be employed and great certainty of action is desired is shown in Fig. 3, and the advantage gained in this arrangement is in the compound leverage exerted upon the biting-surfaces, whereby certainty against slipping is attained. The lever B is recovered from its position in Figs. 1 and 2, and it is put in engagement at its inner end with the lever F at a point near its axis. Thus the force exerted upon the free end of lever B is as to the power applied in inverse ratio to the difference in distance from the axis of the lever F to the point $g$, and to the point at which force is applied; but this power is compounded upon rim $e$, because B is also a lever augmenting upon the rim $e$ the force received at $g$.

In practice I fulcrum the lever F upon the shaft of the wheel A, so that it has always a sufficient and constant support in the best location. The lever B is attached to the lever F by retaining-bars, which confine it as in a sort of cage in proper position upon the edge $e$, yet free to exercise sufficient movement to grip and release said edge. A spring, $h$, is placed between the lever F to press said lever down out of engagement with the edge $e$ when the lever F is retreating.

This device I have found entirely effective and operative under the most adverse circumstances, having had it in operation continuously for a considerable time immersed in oil, yet never failing to grip the edge $e$ effectively.

Having described my invention, I claim as new—

1. The wheel A, provided with the laterally-projecting flange or rim $e$, and the lever B, provided with notch $d$, adapted to fit over and grip said edge, as set forth, combined with a supplemental lever, F, provided with the rest $g$ for engagement with the lever B at its free end only, whereby the power applied to lever F is compounded upon the rim $e$.

2. The wheel A, provided with a laterally-projecting flange or rim, $e$, and the lever B, provided with the notch $d$, adapted to fit over and grip said edge, as set forth, combined with a supplemental lever, F, in engagement with said lever B at its free end, and a spring, $h$, interposed between the free end of lever B and said lever F, to afford a yielding support or temporary fulcrum for said lever B.

GEORGE H. PRESTON.

Witnesses:
OLIVER S. TITUS,
HENRY O. KLINCK.